US008293412B2

(12) United States Patent
McElroy

(10) Patent No.: US 8,293,412 B2
(45) Date of Patent: Oct. 23, 2012

(54) ENHANCED EFFICIENCY OF A COMBINED SORFC ENERGY STORAGE AND FUEL GENERATION SYSTEM

(75) Inventor: James F. McElroy, Suffield, CT (US)

(73) Assignee: Bloom Energy Corporation, Sunnyvale, CA (US)

(*) Notice: Subject to any disclaimer, the term of this patent is extended or adjusted under 35 U.S.C. 154(b) by 1151 days.

(21) Appl. No.: 11/984,605

(22) Filed: Nov. 20, 2007

(65) Prior Publication Data

US 2009/0130505 A1    May 21, 2009

(51) Int. Cl.
| | |
|---|---|
| H01M 8/18 | (2006.01) |
| H01M 8/06 | (2006.01) |
| H01M 8/04 | (2006.01) |
| C25B 1/00 | (2006.01) |
| C25B 3/00 | (2006.01) |
| C25B 15/00 | (2006.01) |
| C25C 1/00 | (2006.01) |
| C25C 7/08 | (2006.01) |

(52) U.S. Cl. ........ 429/418; 429/411; 429/417; 429/450; 205/343; 205/349

(58) Field of Classification Search .......................... None
See application file for complete search history.

(56) References Cited

U.S. PATENT DOCUMENTS

| | | | |
|---|---|---|---|
| 4,950,371 A * | 8/1990 | McElroy ....................... 205/628 |
| 6,821,663 B2 | 11/2004 | Mcelroy et al. | |
| 6,924,053 B2 * | 8/2005 | McElroy ....................... 429/411 |
| 7,045,238 B2 * | 5/2006 | Gottmann et al. ............. 429/418 |
| 7,276,306 B2 * | 10/2007 | Pham et al. ................... 429/411 |
| 2003/0196893 A1 * | 10/2003 | McElroy et al. .............. 204/266 |
| 2004/0028965 A1 * | 2/2004 | McElroy et al. ............... 429/21 |
| 2004/0202914 A1 * | 10/2004 | Sridhar et al. .................. 429/34 |
| 2004/0224193 A1 | 11/2004 | Mitlitsky et al. | |
| 2005/0048334 A1 | 3/2005 | Sridhar et al. | |
| 2005/0053812 A1 * | 3/2005 | Hickey et al. ................... 429/21 |
| 2005/0183948 A1 * | 8/2005 | Rusta-Sallehy et al. ... 204/228.6 |
| 2006/0222912 A1 * | 10/2006 | Smith ............................. 429/21 |
| 2007/0031718 A1 * | 2/2007 | Fujimura et al. ............... 429/34 |
| 2007/0128478 A1 * | 6/2007 | Ballantine et al. ............. 429/17 |
| 2007/0178338 A1 * | 8/2007 | McElroy et al. ............... 429/17 |
| 2008/0241612 A1 * | 10/2008 | Ballantine et al. ............. 429/17 |

FOREIGN PATENT DOCUMENTS

WO   WO 2007/109034 A2   9/2007

\* cited by examiner

*Primary Examiner* — N Drew Richards
*Assistant Examiner* — Michael Jung
(74) *Attorney, Agent, or Firm* — The Marbury Law Group, PLLC

(57) ABSTRACT

A fuel cell system includes a solid oxide reversible fuel cell (SORFC) stack that is adapted to generate an exhaust stream containing hydrogen and water vapor from an outlet of the SORFC stack when the SORFC stack is operated in an electrolysis mode, a polymer electrolyte membrane (PEM) hydrogen pump that is adapted to separate at least a portion of the hydrogen contained in the exhaust stream, a first conduit that is adapted to provide the exhaust stream from the outlet of the SORFC stack into an inlet of the PEM hydrogen pump, and a second conduit that is adapted to provide at least a portion of remaining exhaust stream from an outlet of the PEM hydrogen pump into an inlet of the SORFC stack.

8 Claims, 1 Drawing Sheet

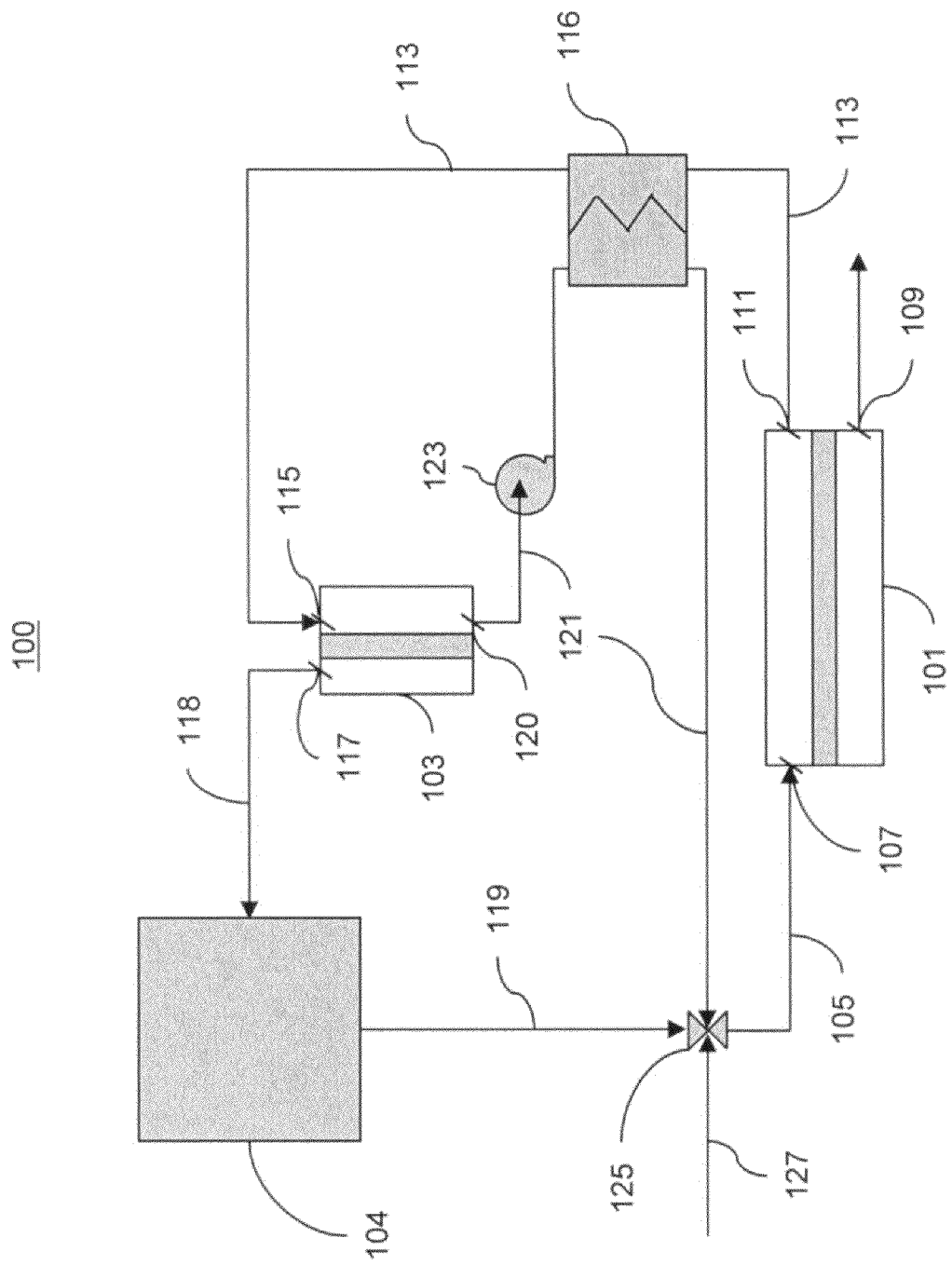

US 8,293,412 B2

ENHANCED EFFICIENCY OF A COMBINED SORFC ENERGY STORAGE AND FUEL GENERATION SYSTEM

BACKGROUND OF THE INVENTION

The present invention is generally directed to the field of fuel cells and more particularly to solid oxide reversible fuel cell systems.

Fuel cells are electrochemical devices which can convert energy stored in fuels to electrical energy with high efficiencies. Electrolyzer cells are electrochemical devices which can use electrical energy to reduce a given material, such as water, to generate a fuel, such as hydrogen. The fuel and electrolyzer cells may comprise reversible cells which operate in both fuel cell and electrolysis mode.

In a high temperature fuel cell system, such as a solid oxide fuel cell (SOFC) system, an oxidizing flow is passed through the cathode side of the fuel cell while a fuel flow is passed through the anode side of the fuel cell. The oxidizing flow is typically air, while the fuel flow can be a hydrocarbon fuel, such as methane, natural gas, pentane, ethanol, or methanol. The fuel cell, operating at a typical temperature between 750° C. and 950° C., enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide. The excess electrons from the negatively charged ion are routed back to the cathode side of the fuel cell through an electrical circuit completed between anode and cathode, resulting in an electrical current flow through the circuit. A solid oxide reversible fuel cell (SORFC) system generates electrical energy and reactant product (i.e., oxidized fuel) from fuel and oxidizer when operating in a fuel cell or discharge mode and generates the fuel and oxidant using electrical energy when operating in an electrolysis or charge mode.

When an SORFC system is operating in the electrolysis mode, a mixture of water and hydrogen is generated and may then be circulated through the fuel generation chambers of the cells within the stack. The mixture of water and hydrogen must be separated prior to delivery of the hydrogen to storage and/or to the customer. Conventionally, a gravity separator is used to separate the hydrogen from the mixture. In that case, the mixture must be cooled to condense the water in the mixture prior to separation and must then be re-evaporated prior to reintroduction to the SORFC stack. The separated hydrogen is typically humid following gravity separation and must be dried prior to storage and/or use as a fuel. Additionally, a compressor is typically used to pressurize the dried hydrogen prior to storage and/or use as a fuel. Each aspect of the process of condensing, re-evaporating, drying, and compressing requires the use of additional system components and the expenditure of additional energy in the SORFC system, thereby adding bulk to and decreasing the energy efficiency of the system.

SUMMARY OF THE INVENTION

One aspect of the invention provides a fuel cell system that includes a solid oxide reversible fuel cell (SORFC) stack, a polymer electrolyte membrane (PEM) hydrogen pump, a first conduit, and a second conduit. The SORFC stack is adapted to generate an exhaust stream from an outlet of the SORFC stack when the SORFC stack is operated in an electrolysis mode. The exhaust stream includes hydrogen and water vapor. The PEM hydrogen pump is adapted to separate at least a portion of the hydrogen contained in the exhaust stream. The first conduit is adapted to provide the exhaust stream from the outlet of the SORFC stack into an inlet of the PEM hydrogen pump. The second conduit is adapted to provide at least a portion of remaining exhaust stream from an outlet of the PEM hydrogen pump into an inlet of the SORFC stack.

Another aspect of the invention provides a fuel cell system that includes a SORFC stack, a first means for separating at least a portion of hydrogen contained in an exhaust stream of the SORFC stack, wherein water contained in the exhaust stream is in a gaseous state, a second means for providing the exhaust stream from the SORFC stack to the first means, and a third means for providing at least a portion of remaining exhaust stream from the first means to the SORFC stack.

BRIEF DESCRIPTION OF THE DRAWINGS

FIG. 1 is a schematic diagram of a fuel cell system of an embodiment of the invention.

DETAILED DESCRIPTION OF THE PREFERRED EMBODIMENTS

The present inventor has realized that a solid oxide reversible fuel cell (SORFC) system can be operated in electrolysis mode to generate hydrogen fuel without the need to condense the water vapor in the exhaust stream prior to separating the hydrogen from the exhaust stream. Moreover, the present inventor has realized that a portion of the remaining exhaust stream can be circulated into the inlet stream without the need to re-evaporate the remaining exhaust stream prior to reintroduction to the SORFC stack. Furthermore, the separated hydrogen is dry upon separation and, therefore, no additional drier is needed in the system. In addition, the hydrogen is already pressurized upon separation and, therefore, no additional compressor is needed in the system.

FIG. 1 illustrates how a high-temperature hydrogen pump is used within a fuel cell system, such as a SORFC system, to separate and circulate an exhaust stream containing water and hydrogen, while maintaining the water in a gaseous state throughout the process of separation and circulation. The SORFC system 100 contains a fuel cell stack 101, such as a SORFC stack (illustrated schematically to show one solid oxide fuel cell of the stack containing a ceramic electrolyte, such as yttria or scandia stabilized zirconia, an anode electrode, such as a nickel-stabilized zirconia cermet, and a cathode electrode, such as lanthanum strontium manganite). An electrically conductive contact layer, such as a nickel contact layer, may be provided between the anode electrode and the adjacent interconnect. A gas flow separator interconnect (referred to as a gas flow separator plate in a planar stack) separates the individual cells in the stack. The stack 101 can be any suitable solid oxide fuel cell stack that can be operated in an electrolysis mode, such as the stacks described in U.S. Pat. No. 7,045,238, U.S. application Ser. No. 10/653,240, which published as U.S. Published Application Number 2005/0048334, U.S. application Ser. No. 10/866,238, which published as U.S. Published Application Number 2004/0224193, and PCT Application Number PCT/US07/06373, all of which are incorporated herein by reference in their entirety.

The system 100 also contains a high-temperature hydrogen pump 103, which electrochemically separates hydrogen from the exhaust stream of the SORFC stack 101. The pump 103 may comprise any high-temperature pump that separates hydrogen from the exhaust stream while operating at a sufficiently high temperature suitable for maintaining water vapor in a gaseous state, such as at a temperature above 100° C., such as between about 100° C. to about 200° C. The pump 103 also pressurizes the hydrogen while separating the hydrogen from the water.

The pump 103 may comprise a cell containing an anode, cathode, and a high-temperature, low-hydration exchange membrane, such as a polymer electrolyte membrane (PEM). The hydrogen diffuses through the polymer electrolyte under an application of a potential difference between anode and cathode electrodes located on either side of the electrolyte. The PEM hydrogen pump may include at least one polybenzimidazole (PBI) membrane. If the PEM is configured with sulfonic acid, the sulfonic acid is chemically bonded to the membrane fluorocarbon backbone, and water within the membrane enables the transport of hydrogen ions under an applied voltage differential. During this process, the water is "dragged" through the membrane towards the cathode, where the product hydrogen is produced. This process is also referred to as "proton water drag" or "proton water pumping." If, on the other hand, the PBI PEM is doped with phosphoric acid, the phosphoric acid is imbibed within the membrane with substantially no chemical bonding to the membrane. The phosphoric acid is free to transport back and forth across the membrane and enables the transport of hydrogen ions across the membrane. Preferably, the low phosphoric acid vapor pressure and high surface tension retains the phosphoric acid within the membrane. Preferably, the phosphoric-acid-doped PBI PEM exhibits substantially no "proton water drag" or "proton water pumping" during the transport of hydrogen ions. The PEM hydrogen pump includes those described in U.S. application Ser. No. 10/360,583, which published as U.S. Published Application Number 2003/0196893, and U.S. application Ser. No. 11/730,255, all of which are incorporated herein by reference in their entirety.

The membranes of the pump 103 can be arranged in either a cascaded or a non-cascaded configuration. In a cascaded pump, several sets of cells are arranged in process fluid flow series so that the exhaust from one set of cells is used as an input for the next set of cells. In each set of at least two cells, at least two cells are arranged in parallel, such that the input stream is divided among the cells in the set. In other words, any one cell in one set is in process fluid flow series configuration with any one other cell in a different set, but all cells in each set are preferably in process fluid flow parallel configuration with respect to each other. The pump 103 may contain two or more sets of cells, such as three to five sets of cells. Each set of cells may contain one or more cells, such as one to twenty cells. Preferably, but not necessarily, each set contains more cells than the set(s) located downstream from it.

The system 100 also contains a hydrogen storage/use subsystem 104. This subsystem 104 may comprise a hydrogen storage vessel, such as a hydrogen storage tank, a hydrogen dispenser, such as a conduit which provides hydrogen or a hydrogen-rich stream to a hydrogen-fueled device, such as a hydrogen-fueled device used in transportation, power generation, cooling, hydrogenation reactions, or semiconductor manufacture. For example, the subsystem 104 may comprise a conduit leading to a hydrogen-using device or the subsystem may comprise the hydrogen-using device itself. For example, the hydrogen storage/use subsystem 104 includes the subsystems described in U.S. application Ser. No. 10/866,238, which published as U.S. Published Application Number 2004/0224193, which is incorporated herein by reference in its entirety.

A method of operating the system 100 in an electrolysis mode is now described. A water inlet stream is provided through a conduit 105 into an inlet 107 of the SORFC stack 101. The water inlet stream may contain pure water or a mixture of water and hydrogen. An optional heat exchanger heats and evaporates the water inlet stream being provided into the stack 101. Optionally, the water inlet stream is heated and evaporated using a heat storage material, such as a metal hydride, which is adapted to store waste heat from the stack 101 during fuel cell mode and which is adapted to heat and evaporate the water inlet stream during electrolysis mode, as described in U.S. Pat. No. 6,821,663, which is incorporated herein by reference in its entirety. Upon entering the inlet 107, the water inlet stream is introduced to the cathode of the SORFC stack 101. A direct current power source (not shown) is connected to the anode electrode and the cathode electrode in such a way that when electrical current is flowing, the anode electrode takes on a positive voltage charge and the cathode electrode takes on a negative voltage charge. When the electric current is flowing, the water inlet stream gives up oxygen ions to form a mixture containing primarily hydrogen. Oxygen ions transport across the electrolyte under the electrical current. The oxygen ions are converted into an oxidant, such as oxygen gas, on the anode electrode. The oxygen gas is discharged from an outlet 109, while an exhaust stream containing a mixture of hydrogen and water is discharged from an outlet 111 into a conduit 113.

The exhaust stream is provided through the conduit 113 into an inlet 115 of the hydrogen pump 103. Preferably, the water contained in the exhaust stream in the conduit 113 is maintained in a gaseous state and is not condensed prior to introduction into the hydrogen pump 103. The exhaust stream being discharged from the stack 101 has a temperature of about 750° C. to about 950° C., such as about 850° C., and may be cooled within the conduit 113 to the operating temperature of the pump 103. For example, the exhaust stream entering the inlet 115 of the pump 103 has a temperature of about 100° C. to about 200° C., such as about 120° C. to about 190° C., and more particularly about 180° C. Optionally, a regenerative heat exchanger 116 is used in the conduit 113 to remove heat from the exhaust stream. The conduit 113 may comprise a total surface area and thermal conductivity designed to remove sufficient heat from the exhaust stream before it is provided into the pump 103.

The pump 103 is operated in an electrochemical pumping mode to separate hydrogen from the exhaust stream and to compress the hydrogen to higher pressures. If a PEM hydrogen pump is used, then the exhaust stream provided to the pump 103 should contain at least enough water vapor to hydrate the high-temperature, low-hydration membrane in the hydrogen feed chamber. Electrical power is applied to the anode and cathode of the PEM cells such that the hydrogen provided to the pump 103 is catalyzed and disassociated into protons and electrons. The protons conduct through the membrane and combine with electrons at the hydrogen product electrode to produce hydrogen product gas. Product gas is discharged through an outlet 117 of the hydrogen pump 103. The electrical power can be either current controlled or voltage controlled. Current control provides a specific hydrogen product flow rate at outlet 117. Voltage control provides a specific hydrogen partial pressure at outlet 117. The hydrogen feed electrode may be supplied hydrogen feed gas at or near ambient pressure, and the hydrogen product electrode may operate to discharge product hydrogen gas at elevated pressure. For example, the hydrogen partial pressure in conduit 118 exiting outlet 117 is greater than the hydrogen partial pressure in conduit 113 entering inlet 115. The hydrogen product electrode may operate at pressures up to 6000 psig or higher depending on the mechanical strength of the cell components and the ability of the current source to supply adequate electrons.

The separated hydrogen being exhausted from the outlet 117 of the pump 103 is pressurized and contains substantially no water. For example, the separated hydrogen comprises at least 95% molecular hydrogen, such at least 99% molecular hydrogen, for example about 100% molecular hydrogen. An optional control valve (not shown) at or near the outlet 117 controls the amount of the separated hydrogen that is provided to the subsystem 104. The subsystem 104 can provide the separated hydrogen to the SORFC stack 101 via a conduit 119 in order to supply the stack 101 with fuel for electricity generation when the stack 101 is operated in a fuel cell mode. In that case, the stack 101 may be considered to be the hydrogen-fueled device and part of the subsystem 104.

At least a portion of remaining exhaust stream is provided into inlet 107 of the SORFC stack 101. For example, the unreacted hydrogen and water are discharged via an outlet 120 of the hydrogen pump 103 and provided via conduit 121 to the SORFC stack 101. Preferably, the water contained in the remaining exhaust stream exiting outlet 120 is maintained in a gaseous state and need not be re-evaporated in the conduit 121 prior to introduction into the SORFC stack 101. Optionally, a circulation blower 123 in the conduit 121 maintains a sufficient flow rate in the conduit 121. The remaining exhaust stream in the conduit 121 may be passed through the heat exchanger 116 in order to raise the temperature of the remaining exhaust stream in the conduit 121 by gaining at least a portion of the heat removed from the exhaust stream in the conduit 113. For example, the remaining exhaust stream in the conduit 121 is heated to about 300° C. or higher, prior to being provided into the stack 101. Optionally, a valve 125 is positioned between the conduits 105, 121 and controls the amount of remaining exhaust stream being provided from the conduit 121 into the water inlet stream in the conduit 105. The valve 125 may also control the amount of makeup steam provided from the conduit 127 to the stack 101, whose waste heat is stored in a heat storage material, such as a metal hydride, during fuel cell mode and is then used to convert water into the makeup steam during electrolysis mode, as described in U.S. Pat. No. 6,821,663, which is incorporated herein by reference in its entirety. The valve 125 may also control the amount of separated hydrogen provided from the subsystem 104 via the conduit 119 to the SORFC stack 101 when the stack 101 is operating in a fuel cell mode.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

What is claimed is:

1. A method of operating a fuel cell system, comprising:
   providing a water inlet stream into a solid oxide reversible fuel cell stack operating in an electrolysis mode;
   generating a first exhaust stream from the fuel cell stack, wherein the first exhaust stream comprises hydrogen and water vapor;
   separating at least a portion of the hydrogen from the first exhaust stream to form a separate separated hydrogen portion and a second exhaust stream comprising water vapor using a hydrogen pump comprising at least one exchange membrane operated at a temperature of about 100° C. to about 200° C.; and
   providing at least a portion of the second exhaust stream from the hydrogen pump into the water inlet stream;
   wherein the water vapor in the first exhaust stream is not condensed between the steps of generating the first exhaust stream and separating the at least a portion of the hydrogen from the first exhaust stream; and
   wherein the water vapor in the first and the second exhaust streams is maintained in a gaseous state during the steps of separating the at least a portion of hydrogen from the first exhaust stream and providing the at least a portion of the second exhaust stream.

2. The method of claim 1, wherein the hydrogen pump is operated such that the water vapor in the first and second exhaust stream is maintained in a gaseous state during the steps of separating the at least a portion of hydrogen from the first exhaust stream and providing the at least a portion of the second exhaust stream.

3. The method of claim 2, wherein:
   the hydrogen pump comprises an exchange membrane cell stack comprising the at least one exchange membrane.

4. The method of claim 2, wherein the hydrogen pump comprises a polymer electrolyte membrane (PEM) hydrogen pump comprising at least one polybenzimidazole (PBI) membrane doped with phosphoric acid.

5. The method of claim 4, wherein the PBI membrane is arranged in process fluid flow series with at least one other PBI membrane.

6. The method of claim 1, wherein:
   the separated hydrogen portion comprises no more than 5% water and any water present in the separated hydrogen portion is in a gaseous state; and
   the at least a portion of the second exhaust stream comprises hydrogen and water vapor.

7. The method of claim 1, wherein the separated hydrogen portion comprises a hydrogen partial pressure greater than a hydrogen partial pressure in the first exhaust stream.

8. The method of claim 1, wherein all water entering and leaving the hydrogen pump is in a gaseous state.

* * * * *